United States Patent
Camus et al.

(10) Patent No.: US 11,052,620 B2
(45) Date of Patent: Jul. 6, 2021

(54) DEVICE FOR GUIDING A FIBER TEXTURE ON AN IMPREGNATION MANDREL, AND AN ASSOCIATED IMPREGNATION MANDREL AND WINDING MACHINE

(71) Applicant: SAFRAN AIRCRAFT ENGINES, Paris (FR)

(72) Inventors: Erwan Camus, Moissy-Cramayel (FR); Richard Mathon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 244 days.

(21) Appl. No.: 16/070,099

(22) PCT Filed: Jan. 9, 2017

(86) PCT No.: PCT/FR2017/050044
§ 371 (c)(1),
(2) Date: Jul. 13, 2018

(87) PCT Pub. No.: WO2017/121949
PCT Pub. Date: Jul. 20, 2017

(65) Prior Publication Data
US 2019/0030840 A1    Jan. 31, 2019

(30) Foreign Application Priority Data
Jan. 15, 2016   (FR) ...................................... 1650319

(51) Int. Cl.
*B29C 70/54* (2006.01)
*B29C 70/32* (2006.01)
(Continued)

(52) U.S. Cl.
CPC ............ *B29C 70/543* (2013.01); *B29C 53/56* (2013.01); *B29C 70/32* (2013.01); *F01D 21/045* (2013.01);
(Continued)

(58) Field of Classification Search
CPC ....... B29C 70/543; B29C 53/56; B29C 70/32; F01D 21/045; B29L 2031/7504
See application file for complete search history.

(56) References Cited

U.S. PATENT DOCUMENTS
2013/0087955 A1   4/2013   Plante et al.

FOREIGN PATENT DOCUMENTS
| EP | 1 961 923 A2 | 8/2008 |
| FR | 2 974 026 A1 | 10/2012 |
| FR | 2 981 881 A1 | 5/2013 |

OTHER PUBLICATIONS

International Search Report as issued in International Patent Application No. PCT/FR2017/050044, dated Jun. 1, 2017.

*Primary Examiner* — Ryan M Ochylski
(74) *Attorney, Agent, or Firm* — Pillsbury Winthrop Shaw Pittman LLP

(57) ABSTRACT

A guiding device for guiding a fiber texture on an impregnation mandrel of a winding machine, the device including a first radial spacer for placing facing a first cheekplate of the impregnation mandrel, a second radial spacer for placing facing a second cheekplate of the impregnation mandrel, and a cross-member suitable for supporting the first and second spacers, the cross-member including an adjustment system for adjusting the positions of the first and second spacers and suitable for positioning the first and second spacers apart respectively from the first and second cheekplates of the impregnation mandrel so as to hold a first portion of fiber texture that extends along the first cheekplate pressed against the first cheekplate, and a second portion fiber
(Continued)

texture that extends along the second cheekplate pressed against the second cheekplate, without blocking rotation of the impregnation mandrel.

8 Claims, 6 Drawing Sheets

(51) Int. Cl.
    *B29C 53/56*     (2006.01)
    *F01D 25/24*     (2006.01)
    *F02C 7/04*     (2006.01)
    *F01D 21/04*     (2006.01)
    *B29L 31/00*     (2006.01)

(52) U.S. Cl.
    CPC ................ *F01D 25/24* (2013.01); *F02C 7/04* (2013.01); *B29L 2031/7504* (2013.01); *F05D 2240/14* (2013.01); *F05D 2300/603* (2013.01); *Y02T 50/60* (2013.01)

DEVICE FOR GUIDING A FIBER TEXTURE ON AN IMPREGNATION MANDREL, AND AN ASSOCIATED IMPREGNATION MANDREL AND WINDING MACHINE

CROSS REFERENCE TO RELATED APPLICATIONS

This application is the U.S. National Stage of PCT/FR2017/050044 filed Jan. 9, 2017, which in turn claims priority to French Application No. 1650319, filed Jan. 15, 2016. The contents of both applications are incorporated herein by reference in their entirety.

BACKGROUND OF THE INVENTION

The present invention relates to the general field of making gas turbine casings out of composite material, and more particularly to making retention casings for gas turbine fans in aeroengines.

In a gas turbine aeroengine, a fan casing performs several functions. It defines the air inlet passage into the engine, it supports an abradable material facing the tips of the blades of the fan, it supports an optional soundwave absorber structure for acoustic treatment at the inlet of the engine, and it incorporates or supports an optional retention shield. The shield constitutes a trap for retaining centrifugally projected debris, such as ingested objects or fragments of damaged blades, in order to prevent the debris from passing through the casing and reaching other portions of the aircraft.

Proposals have already been made for making a fan retention casing out of composite material. By way of example, reference may be made to Document EP 1 961 923, which describes fabricating a composite material casing of varying thickness by forming fiber reinforcement as superposed layers of a fiber texture and by densifying the fiber reinforcement with a matrix. In that invention, the fiber texture is made by three-dimensional weaving to have varying thickness and it is wound as a plurality of superposed layers on a central annular wall of an impregnation mandrel of profile corresponding to the profile of the casing that is to be made. The fiber preform as obtained in that way is held on the impregnation mandrel, and it is impregnated with a resin prior to polymerizing the resin. Winding a woven texture of varying thickness onto a mandrel as described in that document makes it possible to obtain directly a tubular preform that has the desired profile with varying thickness.

In practice, performing that method raises the problem of holding the fiber preform while it is being wound on the impregnation mandrel, and more particularly of holding in a vertical position the margin portions of the fiber texture that are to form the future flanges of the casing.

The winding is performed under tension so as to keep the woven preform compact in its central portion. This tension presses the layer of fiber texture that is being wound against the layers of fiber texture that have already been wound onto the impregnation mandrel. During winding, the flanges, i.e. the margin portions of the fiber texture, move from a horizontal position on a take-up mandrel to a vertical position on the impregnation mandrel by resting directly or indirectly against cheekplates of the impregnation mandrel.

While the flanges are transiting from the horizontal position to the vertical position, they tend to fall inwards onto the fiber texture wound on the central annular wall of the impregnation mandrel. After a flange has fallen inwards, and when engaging a new turn, the flange that has fallen inwards may become located under the new turn of fiber texture in its air-passage portion, i.e. in the stack on the central annular wall, instead of being in a flange portion. The preform as wound on the impregnation mandrel then presents a defect due to local extra thickness associated with a loss of thickness in the future flange.

The only presently-existing solution consists in visually monitoring the positioning of the flange during winding and in holding the fiber texture manually upstream from the flange overlap zone.

An error of inattention or poor training of the operator performing the winding can lead to a part that is defective.

OBJECT AND SUMMARY OF THE INVENTION

The invention seeks to mitigate such drawbacks by proposing guidance for the flange that is being wound, which guidance enables the positions of the fiber texture flanges against the cheekplates of an impregnation mandrel to be controlled immediately prior to taking on an additional turn.

This object is achieved by a guidingguiding device for guiding a fiber texture on an impregnation mandrel of a winding machine, the device comprising a first radial spacer for placing facing a first cheekplate of the impregnation mandrel, a second radial spacer for placing facing a second cheekplate of the impregnation mandrel, and a cross-member suitable for supporting the first and second spacers, the cross-member including adjustment means for adjusting the positions of the first and second spacers and suitable for positioning the first and second spacers apart respectively from the first and second cheekplates of the impregnation mandrel so as to hold a first portion of fiber texture that extends along the first cheekplate pressed against the first cheekplate, and a second portion of fiber texture that extends along the second cheekplate pressed against the second cheekplate, without blocking rotation of the impregnation mandrel.

Between two consecutive turns of the fiber texture, the spacers of the guidingguiding device are positioned so as to avoid the margin portions of the fiber texture of the portion that has already been wound on the impregnation mandrel drooping so as to pass under the portion of the fiber texture that is coming into contact with the impregnation mandrel in order to be wound.

In other words, by placing the spacers parallel to the planes of the cheekplates between the already-wound fiber texture and the fiber texture that is to form the following layer, the following layer is prevented from being stacked on a flange that has become folded down. The spacers of the guidingguiding device thus enable the flange that is already in place to be kept vertical and enable it to be covered properly by the following layer. The guidingguiding device thus serves to guarantee that covering from one flange to the other is good without human intervention. The term "flange" is used here to mean a margin portion or a stack of margin portions of already-wound fiber texture extending against a cheekplate.

In a first aspect of the guidingguiding device, the adjustment means may comprise, for each of the two spacers, a first module suitable for adjusting the position of the spacer in a first direction as a function of the thickness of the fiber texture and as a function of the number of turns that the mandrel has already made with the fiber texture.

The first module of the adjustment means serve to adjust the spacing between the first spacer and the second spacer and to move each of the two spacers away from the cheekplate with which it co-operates in order to keep the flange in the radial plane bearing against the cheekplate for each new turn of the impregnation mandrel. On each new turn of the impregnation mandrel, the stack of fiber texture layers increases by one additional layer. Consequently, to ensure that rotation of the impregnation mandrel is not blocked and to maintain guidance of the fiber texture, each of the first and second spacers needs to be moved orthogonally to the plane in which the corresponding cheekplate extends, going away from the cheekplate. In other words, the first and second spacers are moved towards each other after one turn has been taken on.

In a second aspect of the guidingguiding device, the adjustment means may comprise, for each of the two spacers, a second module suitable for adjusting the position of the spacer in a second direction, different from the first direction, both as a function of the shape and the diameter of the impregnation mandrel, and also as a function of the thickness of the fiber texture and of the number of turns that the mandrel has already made with the fiber texture.

The second module of the adjustment means serves for each of the first and second spacers to adjust the distance between the spacer and the central annular wall of the impregnation mandrel. Before starting winding, the second module thus serves to position the first spacer radially as a function of the diameter of the central annular wall of the section situated in the plane in which the first spacer extends parallel to and in the proximity of the first cheekplate. before starting winding, the second module serves likewise to position the second spacer as a function of the diameter of the central annular wall of the section situated in the plane in which the second spacer extends parallel to and in the proximity of the second cheekplate.

The first and second spacers can thus be positioned in the second direction in positions that are different, depending on the shape of the impregnation mandrel.

While winding the fiber texture onto the impregnation mandrel, the second module also serves to move each of the first and second spacers in the second direction. The first and second spacers can thus be moved away from the central annular wall of the impregnation mandrel for each new turn of the impregnation mandrel so as to take account of the increase in the stack of fiber texture layers on each turn. This makes it possible to avoid any risk of blocking rotation of the impregnation mandrel.

Since the first and second spacers are also moved in the first direction parallel to the axis of rotation of the mandrel, i.e. orthogonally to the second direction, it is possible for the diameter of the impregnation mandrel to be different after the spacers have moved in the first direction. Consequently, in spite of the thickness of the stack of fiber texture layers increasing, it is possible that for a new turn of the impregnation mandrel, the first and/or the second spacer is/are not moved in the second direction, e.g. in the event of the increase in the thickness of the stack of layers of fiber texture being compensated by a reduction in the diameter of the central annular wall of the mandrel, or even for it/them to be moved towards the central wall, e.g. in the event of the diameter of the central annular wall of the mandrel decreasing by more than the increase in the thickness of the stack of layers of fiber texture for a new turn of the impregnation mandrel.

In a third aspect of the guidingguiding device, the guidingguiding device may include an electronic control unit suitable for controlling automatic actuation of the adjustment means as a function of the winding of the fiber texture on the impregnation mandrel.

The electronic control unit may be coupled to one or more sensors mounted on the guidingguiding device and suitable for detecting the position, both in the first direction and in the second direction, of the fiber texture that is wound on the impregnation mandrel, the electronic control unit thus controlling the movement of both spacers of the guidingguiding device in the first and second directions.

The electronic control unit may also be coupled to a control unit for the impregnation mandrel so as to control the movement and the initial positioning of the two spacers of the guidingguiding device in the first and second directions solely as a function of information supplied by the control unit for the impregnation mandrel or on the basis of information delivered by the sensors of the guidingguiding device and of information delivered by the control unit for the impregnation mandrel.

In a fourth aspect of the guidingguiding device, at least one of the first and second spacers may be made of plastics material, such as Teflon®.

Making at least one of the spacers out of plastics material serves to limit friction and pollution of the preform that is being formed by winding the fiber texture on the impregnation mandrel.

In a fifth aspect of the guiding device, for each of the first and second spacers, said spacer is associated with an additional radial spacer arranged parallel with said spacer so as to define at least one annular guiding rail portion between the spacer and the additional spacer, the guiding rail being for receiving a portion of fiber texture being wound that is to extend along a corresponding cheekplate while the face of said spacer facing away from said additional spacer holds at least one layer of the portion of fiber texture that has already been wound and that extend along said cheekplate so that is presses against the cheekplate.

The additional spacer thus serves to form a guiding rail for the margin portions of the fiber texture that are about to be wound. This makes it possible to initiate the orthogonal orientation of the margin portions relative to the portion of the fiber texture that extends between the margin portions before beginning to wind this portion of the fiber texture onto the impregnation mandrel.

This orientation prior to winding thus serves to avoid any risk of the margin portion rubbing against the flange formed by the already-wound fiber texture, while also serving, by means of the additional spacer, to prevent the margin portion as pre-oriented in this way dropping and folding down onto the fiber texture portion that extends between the two margin portions.

In a sixth aspect of the guiding device, the guiding device may include two guiding spirals, each suitable for making one complete turn around the central annular wall of the impregnation mandrel that extends between the first and second cheekplates, each guiding spiral having a first end forming said spacer and a second end opposite from the first end forming said additional spacer.

This embodiment makes it possible to provide annular guidance all along the path followed by the fiber texture around the impregnation mandrel, while minimizing the number of parts.

The invention also provides an impregnation mandrel of a winding machine that is to receive fiber reinforcement formed by superposed layers of a fiber texture in order to fabricate a gas turbine casing out of composite material, the impregnation mandrel comprising a central annular wall of profile corresponding to the profile of the casing that is to be fabricated, and first and second cheekplates of profiles that correspond to the profiles of outer flanges of the casing that is to be fabricated.

According to a general characteristic of the impregnation mandrel, it may include a guiding device as defined above, the first radial spacer being arranged facing the first cheekplate and the second radial spacer being arranged facing the second cheekplate, the first and second spacers being spaced apart respectively from the first and second cheekplates in order to hold respective first and second portions of fiber texture that extend along the first and second cheekplates respectively pressed against the first cheekplate and the second cheekplate without blocking rotation of the mandrel.

The guiding device may be integrated with the impregnation mandrel.

In another aspect of the impregnation mandrel, it may include an electronic safety unit suitable for causing the impregnation mandrel to stop as soon as the force exerted on the first spacer or the second spacer respectively by the first portion and/or the second portion of the fiber texture that extend respectively along the first cheekplate or along the second cheekplate becomes greater than a force threshold.

Thus, for highly unstable flanges that tend to fold down in spite of the presence of guidings, the electronic safety unit serves to provide a torque limiter on the spacers. In other words, if the force exerted by an unstable flange of the fiber texture is greater than a predetermined reference value, then a message is sent to the control unit of the winding machine indicating that an anomaly has been observed and causing the winding machine to be stopped.

The invention also provides a winding machine for winding a fiber texture on an impregnation mandrel, the machine comprising a take-up mandrel for storing a fiber texture obtained by three-dimensional weaving and an impregnation mandrel as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

The invention is described below in the context of its application to fabricating a gas turbine aeroengine fan casing. In more general manner, the invention applies to fabricating any annular structural part for a turbine engine.

An example of a method of fabricating such a fan casing is described in Document EP 1 961 923, to which reference may be made.

The casing is made of composite material comprising fiber reinforcement densified by a matrix. The reinforcement is made of fibers, e.g. fibers of carbon, glass, aramid, or ceramic, and the matrix is made of polymer, e.g. epoxy, bismaleimide, or polyimide.

Briefly, the fabrication method described in the above-mentioned document consists in making a fiber texture by three-dimensional weaving with take-up in the warp direction onto a drum (referred to below as the take-up mandrel) having a profile that is determined as a function of the profile of the casing that is to be fabricated.

The fiber texture as made in that way is then transferred onto the mandrel of a resin injection mold (referred to below as the impregnation mandrel) of outside profile that corresponds to the inside profile of the casing that is to be fabricated.

With the preform held on the impregnation mandrel, impregnation is then performed using a resin. For this purpose, a shell is applied against the preform and the resin is injected into the mold as constituted in that way. Impregnation may be assisted by setting up a pressure difference between the inside and the outside of the mold in which the preform is located. After impregnation, a step of polymerizing the resin is performed.

Figure 1:
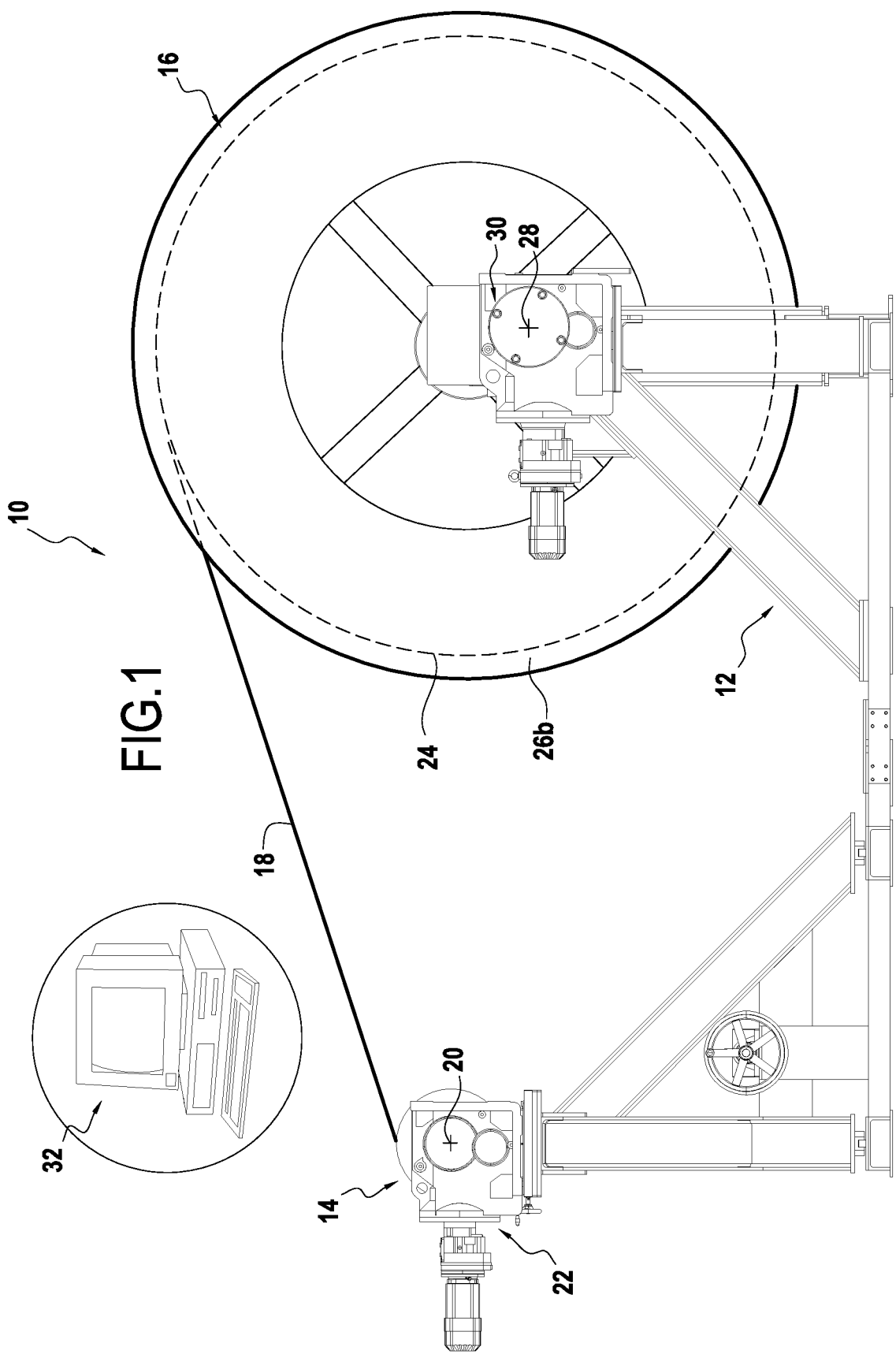
FIG. 1 is a diagrammatic side view of a machine for winding a fiber texture onto an impregnation mandrel in accordance with the invention, and suitable for including a guiding device of the invention (not shown)

The invention, and in particular the guiding device, applies to any type of winding machine having the function of enabling a fiber texture stored on the take-up mandrel to be transferred automatically onto the impregnation mandrel of the resin injection mold, as shown in FIG. 1.

Reference may be made to patent application FR 2 974 026, which describes the structure and the operation of such a machine in detail.

Briefly, the winding machine 10 comprises a frame 12 supporting in particular a take-up mandrel 14 and an impregnation mandrel 16 in accordance with the invention. The mandrels 14 and 16 are removable, i.e. they can be removed from the frame 12.

The take-up mandrel 14 receives the fiber texture 18, e.g. as obtained by three-dimensional weaving. It is carried on a horizontal shaft 20 having one end rotatably mounted on the frame 12 of the winding machine and having its other end coupled to the outlet shaft of an electric motor 22, e.g. an alternating current (AC) electric gear motor.

The assembly constituted by the take-up mandrel 14, its shaft 20, and its electric motor 22 may be mounted in such a manner as to be capable of moving in translation relative to the frame 12 along the axis of rotation 20 of the take-up mandrel 14. This degree of freedom of the take-up mandrel 14 to move in translation enables this mandrel 14 to be put into alignment with the impregnation mandrel 16 prior to winding the fiber texture 18 onto the impregnation mandrel 16.

The impregnation mandrel 16 of the winding machine 10 is for receiving, in superposed layers, the fiber texture 18 that is stored on the take-up mandrel 14. In known manner, it presents a central annular wall 24 having an outside surface of profile that corresponds to the profile of the inside surface of the casing that is to be made, and two cheekplates 26a and 26b of profile that corresponds to the profiles of the outer flanges of the casing at its upstream and downstream ends in order to enable it to be assembled with and connected to other elements.

The impregnation mandrel 16 is carried by a horizontal shaft 28 that is parallel to the axis of rotation 20 of the take-up mandrel 14 and that has one end rotatably mounted on the frame 12 of the winding machine 10 and its other end coupled to the outlet shaft of an electric motor 30, e.g. an AC electric gear motor.

A control unit, e.g. a computer workstation 32, is connected to the electric motors 22, 30 of the two mandrels 14, 16 and it serves to control and monitor the speed of rotation of each mandrel 14, 16. In more general manner, this control unit 32 serves to control all of the operating parameters of the winding machine 10.

With such a machine 10, the fiber texture 18 is wound as superposed layers on the impregnation mandrel 16 while applying an appropriate winding tension to the fiber texture 18. Specifically, a setpoint tension is predefined, in particular as a function of the nature of the fiber texture 18, and it is applied to the mandrel that offers torque opposing winding (generally the take-up mandrel 14) by making use of the computer workstation 32.

By way of example, it may be necessary to wind 4⅛ turns in order to obtain a casing preform having thickness that complies with specifications.

In the invention, the impregnation mandrel 16 has a guiding device 100 for guiding the fiber texture 18.

Figure 2:
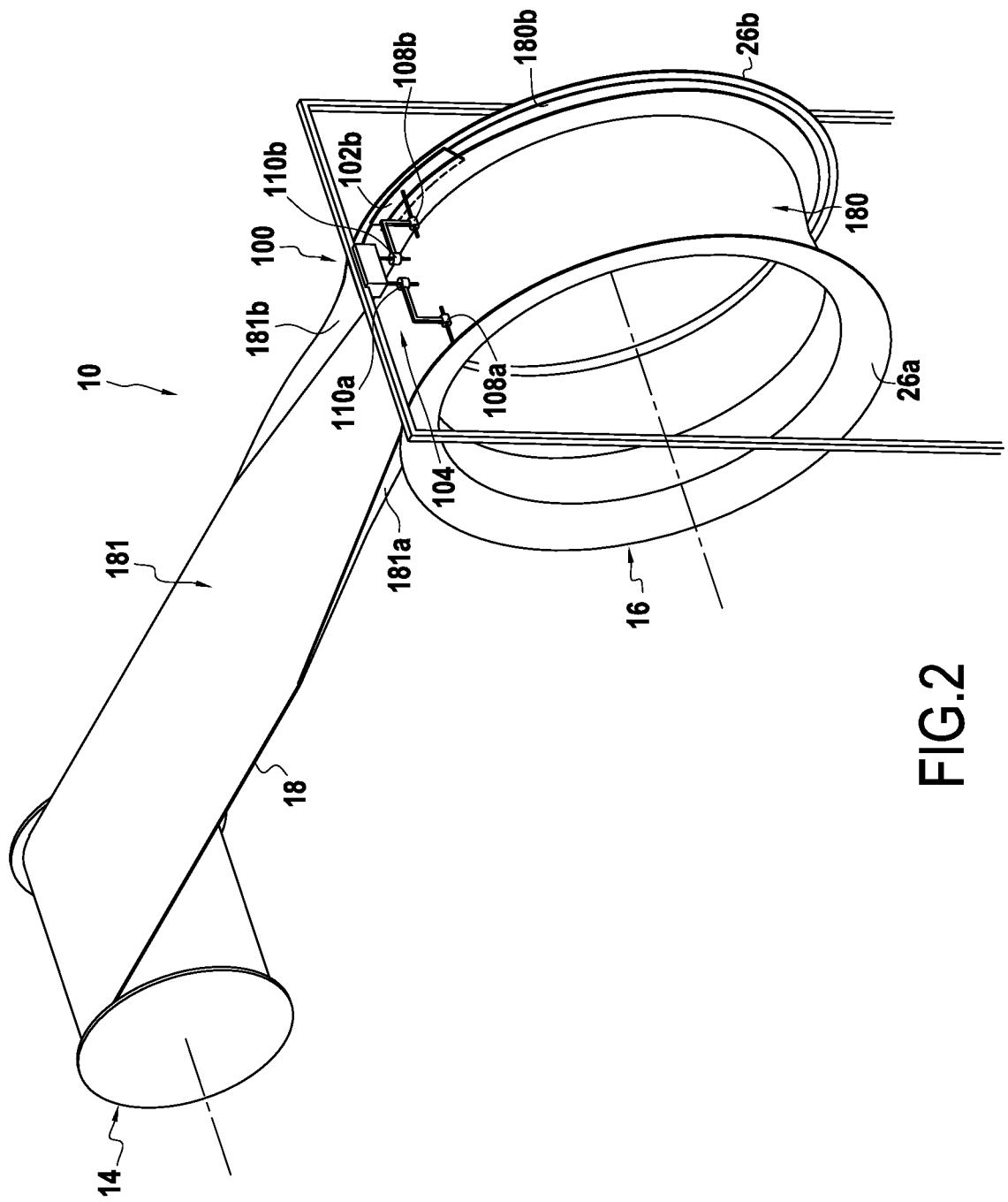
FIGS. 2 and 3 are two fragmentary perspective diagrams of a winding machine in a first embodiment of the invention.
Figure 3:
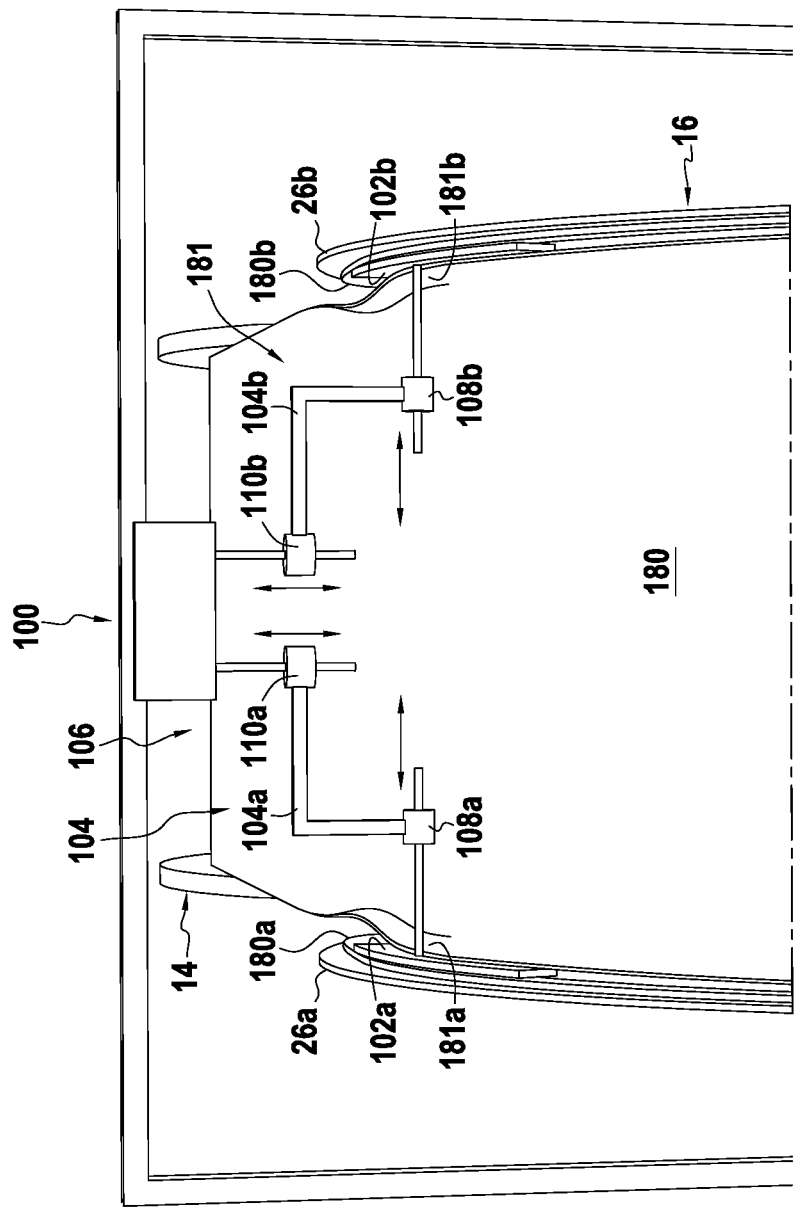

More precisely, and as shown in FIGS. 2 and 3, the guiding device 100 has two radial spacers 102a and 102b mounted on a cross-member 104.

The first spacer 102a is arranged facing the first cheekplate 26a of the impregnation mandrel 16, and the second spacer 102b is arranged facing the second cheekplate 26b. The first spacer 102a lies in a plane parallel to the first cheekplate 26a and the second spacer 102b lies in a plane parallel to the second cheekplate 26b.

Advantageously, both spacers 102a and 102b are made of Teflon®, thereby serving to limit friction and pollution of the fiber texture. Nevertheless, the two spacers could also be made of metal material.

In the first embodiment shown in FIGS. 2 and 3, each of the first and second spacers 102a and 102b possesses the same circularly arcuate shape, forming a crescent-shaped portion.

The circularly arcuate or partially annular shape is easy to make by cutting up an annulus into a plurality of sections.

In the event that a flange being formed by a margin portion 108a or 108b of the already-wound fiber texture 18 has already drooped at least partially onto the portion 180 of the fiber texture 18 that is wound on the central annular portion 24, the half-crescent shape enables the flange to be stood up progressively.

In FIGS. 2 and 3, the already-wound portion of the fiber texture 18 is referenced 180, i.e. the portion that is in contact with the impregnation mandrel 16, and the portion of the fiber texture 18 that has not already been wound is referenced 181, i.e. the portion situated between the take-up mandrel 14 and the impregnation mandrel 16.

The spacers may also be rectangular in shape and positioned so as to extend at least in part along the portion 181 of the fiber texture 18 between the impregnation mandrel 16 and the take-up mandrel 14.

The cross-member 104 includes adjustment means 106 adjusting the positions of the first and second spacers 102a and 102b. The adjustment means 106 are coupled to the first spacer 102a via a first bracket 104a and to the second spacer 102b via a second bracket 104b.

The adjustment means 106 are configured to position the first spacer 102a and the second spacer 102b respectively so as to be spaced apart from the first cheekplate 26a and the second cheekplate 26b of the impregnation mandrel 16 so as to hold a first portion 108a of the fiber texture 18 that extends along the first cheekplate 26a pressing against the first cheekplate 26a, and a second portion 180b of the fiber texture that extends along the second cheekplate 26b pressing against the second cheekplate 26b, while not blocking rotation of the impregnation mandrel 16.

When assembling the guiding device 100 on the impregnation mandrel 16 of the winding machine 10, the first and second spacers 102a and 102b are spaced apart from the first and second cheekplates 26a and 26b respectively by a distance that serves to avoid the margin portions 180a and 180b of the portion 180 of the fiber texture 18 that has already been wound onto the impregnation mandrel 16 drooping between two consecutive turns of the fiber texture 18 on the impregnation mandrel 16 so as to pass under the portion 181 of the fiber texture 18 coming into contact with the impregnation mandrel 16 in order to be wound.

For each of the two spacers 102a and 102b, the adjustment means 106 include a respective horizontal movement module referenced 108a and 108b. Each horizontal movement module 108a, 108b is configured to move the spacer 102a, 102b with which it is associated in a direction that is parallel to the axis of rotation 28 of the impregnation mandrel 16.

The first modules 108a and 108b thus serve to adjust the horizontal positions of the two spacers 102a and 102b as a function of the intrinsic thickness of the fiber texture 18 and as a function of the number of turns that the impregnation mandrel 16 has already made with the fiber texture 18. The spacers 102a and 102b are thus moved horizontally as a function of the thickness of the flanges formed by the margin portions 180a and 180b of the portion 180 of the fiber texture 18 that has already been wound so as to extend along the cheekplates 26a and 26b.

The adjustment means 106 also include respective radial movement modules referenced 110a and 110b for each of the two spacers 102a and 102b. Each radial movement module 110a, 110b is configured to move the spacer 102a, 102b with which it is associated in a direction parallel to the planes in which the corresponding cheekplates 26a, 26b extend.

The radial movement modules 110a and 110b thus serve to adjust the radial positions of the two spacers 102a and 102b as a function both of the intrinsic thickness of the fiber texture 18 together with the number of turns that the impregnation mandrel 16 has already made with the fiber texture 18, and also as a function of the shape and the diameter of the impregnation mandrel 16.

The spacers 102a and 102b are thus moved radially as a function of the thickness of the central portion of the preform formed by the portion extending between the margin portions 180a and 180b of the portion 180 of the already-wound fiber texture 18. Before starting winding, they are also positioned radially as a function of the diameters of the central annular portion 24 of the section situated in the planes in which the spacers 102a, 102b extend parallel to and in the proximity of the corresponding cheekplate 26a, 26b. This is done independently for each of the two spacers 102a and 102b.

While the fiber texture 18 is being wound on the impregnation mandrel 16, the spacers 102a and 102b are also moved radially by means of the radial movement modules 110a and 110b. The first and second spacers 102a and 102b can thus be moved away from the central annular wall 24 of the impregnation mandrel 16 for each new turn so as to accommodate any variation in the diameter of the central annular wall 24 along the axis of rotation 28.

The guiding device 100 also has an electronic control unit connected to the adjustment means 106 so as to control actuation of the horizontal movement modules 108a, 108b and of the radial movement modules 110a, 110b automatically as a function of the winding of the fiber texture 18 on the impregnation mandrel 16.

The electronic control unit is coupled to the control unit 32 of the impregnation mandrel 16 in particular so as to receive information about the number of turns of the mandrel 16.

Figure 4:
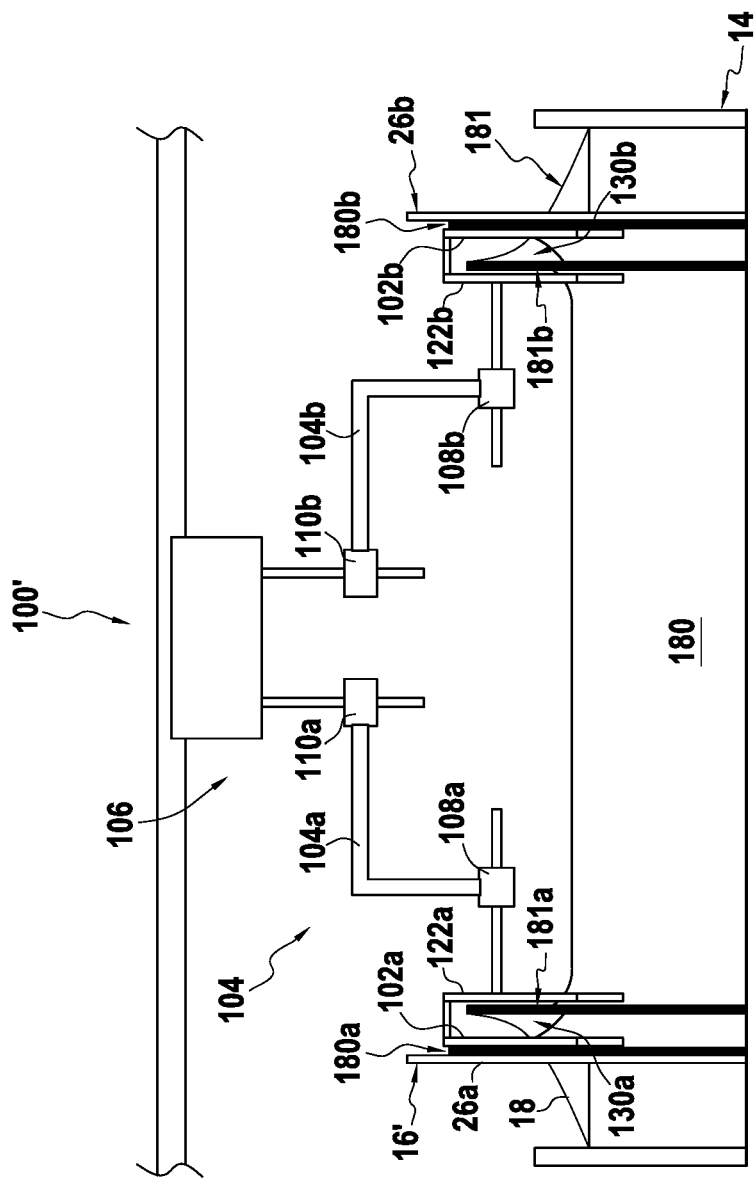
FIG. 4 is a diagrammatic perspective view of an impregnation mandrel in a second embodiment of the invention.

FIG. 4 is a diagrammatic perspective view of an impregnation mandrel 16' in a second embodiment of the invention.

This second embodiment differs from the first embodiment in that the guiding device, now referenced 100', has a first additional spacer 122*a* associated with the first spacer 102*a*, and a second additional spacer 122*b* associated with the second spacer 102*b*.

Each of the two additional spacers 122*a* and 122*b* is arranged parallel to the spacer 102*a* and 102*b* with which it is associated so as to define an annular guiding rail portion 130*a*, 130*b* between the spacer 102*a*, 102*b* and the additional spacer 122*a*, 122*b*.

The guiding rail portion 130*a*, 130*b* is arranged around the zone where the fiber texture 18 comes into contact with the second annular wall 24 of the impregnation mandrel 16. The guiding rail portion 130*a*, 130*b* is thus configured and arranged to receive a margin portion 181*a*, 181*b* of the fiber texture 18 that is to extend along a corresponding cheekplate 26*a*, 26*b* while the spacer 102*a*, 102*b* of the guiding rail portion 130*a*, 130*b* holds at least one margin portion layer 180*a*, 180*b* of the already-wound fiber texture 18 that extends along said cheekplate 26*a*, 26*b* pressed thereagainst. This makes it possible to initiate the radial, or vertical, orientation of the margin portions 181*a*, 181*b* of the portion 181 of the fiber texture 18 prior to being wound onto the impregnation mandrel 16.

The spacer 102*a*, 102*b* and the additional spacer 122*a*, 122*b* of a guiding rail portion 130*a*, 130*b* are secured to each other, e.g. by connecting bars or else they are made integrally out of an upside-down piece of channel-section. This thus makes it possible to move the entire guiding rail portion 130*a*, 130*b* as a whole when using the adjustment means 106.

Figure 5:
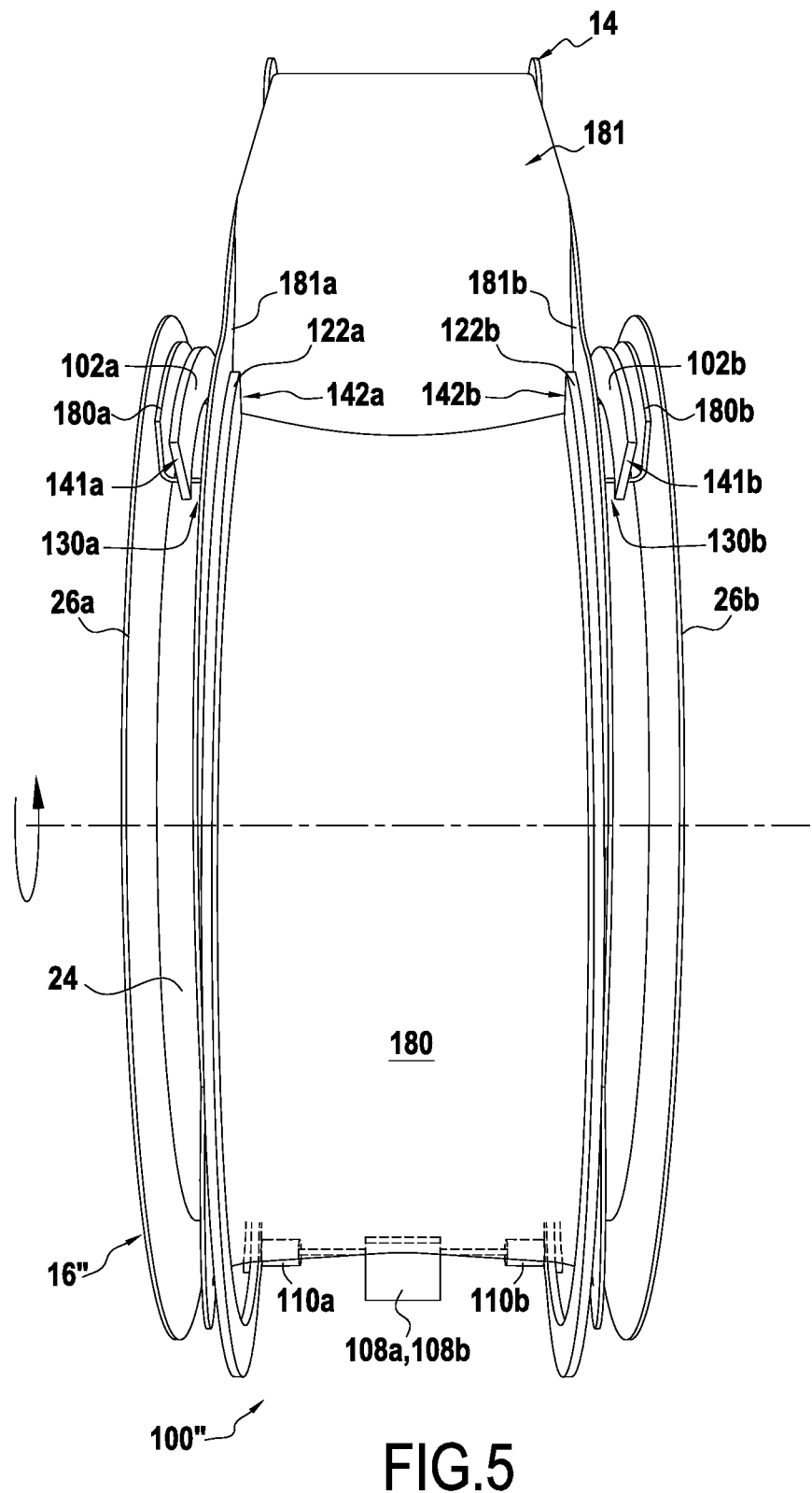
FIGS. 5 and 6 are perspective views respectively of an impregnation mandrel and of a guiding device in a third embodiment of the invention.
Figure 6:
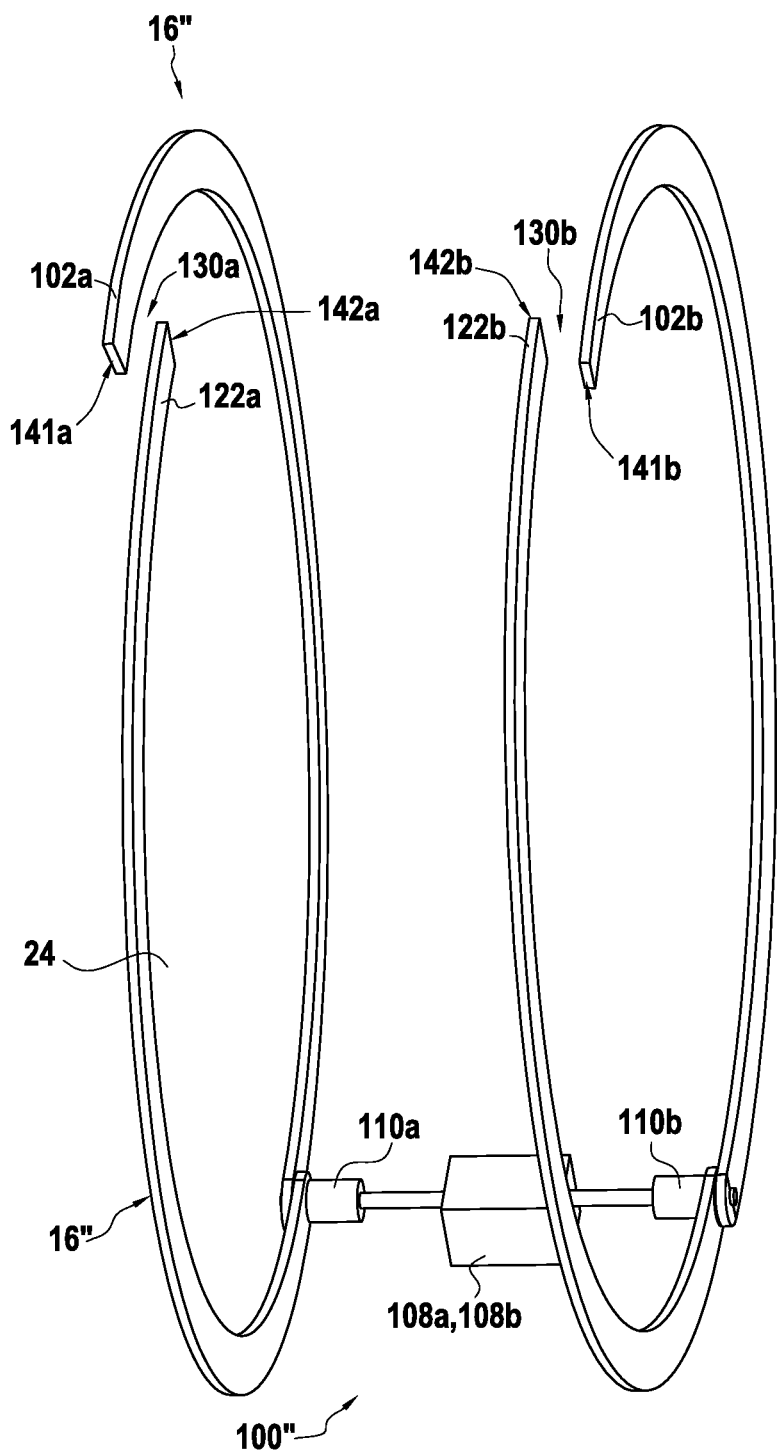

FIGS. 5 and 6 are diagrammatic perspective views respectively of an impregnation mandrel 16" in a third embodiment of the invention and of the guiding device 100" in this third embodiment.

This third embodiment differs from the second embodiment in that the guiding device, how referenced 100", has two guiding spirals, each making one complete turn around the central annular wall 24 of the impregnation mandrel 16". Each guiding spiral has a first end 141*a*, 141*b* forming the spacer 102*a*, 102*b* and a second end 142*a*, 142*b*, opposite from the first end 141*a*, 141*b*, forming the additional spacer 122*a*, 122*b*. The spacer 102*a*, 102*b* and the additional spacer 122*a*, 122*b* of each spiral together form an annular guiding rail portion 130*a*, 130*b*.

In this embodiment, the radial movement modules 110*a*, 110*b* are each configured to act along an axis that is configured to modify the diameter of the annulus formed by the spiral by moving the first end 141*a*, 141*b* and the second end 142*a*, 142*b* towards each other or away from each other while keeping the horizontal separation distance between them constant, i.e. the distance in a direction orthogonal to the plane in which the spiral extends.

The invention is not limited to the embodiments described. Winding machines provided with impregnation mandrels of the invention thus provide guidance for the flange of the preform that is being formed that makes it possible to master the positions of the flanges of the fiber texture against the cheekplates of the impregnation mandrel immediately before taking on an additional turn.

The invention claimed is:

1. A guiding device for guiding a fiber texture on an impregnation mandrel of a winding machine, the device comprising a first radial spacer for placing facing a first cheekplate of the impregnation mandrel, a second radial spacer for placing facing a second cheekplate of the impregnation mandrel, and a cross-member suitable for supporting the first and second spacers, the cross-member including an adjustment system for adjusting the positions of the first and second spacers and arranged to position the first and second spacers apart respectively from the first and second cheekplate of the impregnation mandrel so as to hold a first portion of fiber texture that extends along the first cheekplate pressed against the first cheekplate, and a second portion of fiber texture that extends along the second cheekplate pressed against the second cheekplate, without blocking rotation of the impregnation mandrel.

2. A guiding device according to claim 1, wherein the adjustment system comprises, for each of the two spacers, a first module arranged to adjust the position of the spacer in a first direction as a function of the thickness of the fiber texture and as a function of the number of turns that the mandrel has already made with the fiber texture.

3. A guiding device according to claim 2, wherein the adjustment system comprises, for each of the two spacers, a second module arranged to adjust the position of the spacer in a second direction both as a function of the shape and the diameter of the impregnation mandrel, and also as a function of the thickness of the fiber texture and of the number of turns that the mandrel has already made with the fiber texture.

4. A guiding device according to claim 1, including an electronic control unit arranged to control automatic actuation of the adjustment system as a function of the winding of the fiber texture on the impregnation mandrel.

5. A guiding device according to claim 1, wherein at least one of the first and second spacers is made of plastics material.

6. A guiding device according to claim 1, wherein, for each of the first and second spacers, said spacer is associated with an additional spacer arranged parallel with said spacer so as to define at least one annular guiding rail portion between the spacer and the additional spacer, the guiding rail being for receiving a portion of fiber texture being wound that is to extend along a corresponding cheekplate while the face of said spacer facing away from said additional spacer holds at least one layer of the portion of fiber texture that has already been wound and that extends along said cheekplate so that it presses against the cheekplate.

7. A guiding device according to claim 6, including two guiding spirals, each arranged to make one complete turn around the central annular wall of the impregnation mandrel that extends between the first and second cheekplates, each guiding spiral having a first end forming said spacer and a second end opposite from the first end forming said additional spacer.

8. A guiding device according to claim 1, wherein the adjustment system comprises, for each of the two spacers, a module arranged to adjust the position of the spacer in a second direction both as a function of the shape and the diameter of the impregnation mandrel, and also as a function of the thickness of the fiber texture and of the number of turns that the mandrel has already made with the fiber texture.

* * * * *